(12) United States Patent
Peng et al.

(10) Patent No.: US 11,186,108 B1
(45) Date of Patent: Nov. 30, 2021

(54) SUBLIMATION PRINTING ON TO DARK SURFACES

(71) Applicant: Photo U.S.A. Corporation, Fremont, CA (US)

(72) Inventors: James P. Peng, Fremont, CA (US); Lei Yang, Fremont, CA (US)

(73) Assignee: Photo U.S.A. Corporation, Fremont, CA (US)

( * ) Notice: Subject to any disclaimer, the term of this patent is extended or adjusted under 35 U.S.C. 154(b) by 0 days.

(21) Appl. No.: 17/073,012

(22) Filed: Oct. 16, 2020

(51) Int. Cl.
*B41M 5/30* (2006.01)
*B41M 5/382* (2006.01)
*B32B 1/08* (2006.01)

(52) U.S. Cl.
CPC ............ *B41M 5/38214* (2013.01); *B32B 1/08* (2013.01); *B32B 2307/402* (2013.01); *B32B 2307/75* (2013.01)

(58) Field of Classification Search
CPC .................. B41M 5/38214; B32B 1/08; B32B 2307/402; B32B 2307/75
USPC ....................................................... 428/195.1
See application file for complete search history.

(56) References Cited

U.S. PATENT DOCUMENTS

| | | | |
|---|---|---|---|
| 3,130,107 | A | 4/1964 | Shank, Jr. |
| 3,297,508 | A | 1/1967 | Jahp |
| 3,816,221 | A | 6/1974 | Shank |
| 3,904,355 | A | 9/1975 | Takahashi |
| 4,046,936 | A | 9/1977 | Schachter |
| 4,328,268 | A | 5/1982 | Tsuji et al. |
| 4,640,191 | A | 2/1987 | Bradley |
| 4,652,337 | A | 3/1987 | Picone et al. |
| 4,662,966 | A | 5/1987 | Sumi et al. |
| 4,692,198 | A | 9/1987 | Borresen |
| 4,712,512 | A | 12/1987 | Schreib et al. |
| 4,765,581 | A | 8/1988 | Wallace et al. |
| 4,874,454 | A | 10/1989 | Talalay et al. |
| 4,959,008 | A | 9/1990 | Wasulko |
| 4,989,508 | A | 2/1991 | King |
| 5,019,193 | A | 5/1991 | Aramini |
| 5,170,704 | A | 12/1992 | Warren et al. |
| D339,267 | S | 9/1993 | Hatt |
| 5,296,081 | A | 3/1994 | Morin et al. |
| 5,308,426 | A | 5/1994 | Claveau |

(Continued)

FOREIGN PATENT DOCUMENTS

| | | |
|---|---|---|
| CA | 2039054 A1 | 10/1991 |
| DE | 4432018 A1 | 5/1996 |

(Continued)

*Primary Examiner* — Betelhem Shewareged
(74) *Attorney, Agent, or Firm* — Stetina Brunda Garred & Brucker

(57) ABSTRACT

A heat transfer process on to a stainless steel cup with a dark surface involves a stainless steel dark surface treatment layer arranged on a base layer of the outer circular surface of the cup body. The stainless steel dark surface treatment layer is sequentially arranged as at least one wire screen printing layer, a resin layer, and a thermal transfer image layer. The is one or several screen printing layers on the dark rough surface to fill up the rough pits on the dark surface to form a smooth surface and then a thermal transfer resin coating is applied, followed by heat transfer printing. A colorful personalized product can thus be produced from the cup.

17 Claims, 1 Drawing Sheet

(56) References Cited

U.S. PATENT DOCUMENTS

| | | |
|---|---|---|
| 5,382,313 A | 1/1995 | Eminger |
| 5,395,478 A | 3/1995 | Sattler et al. |
| 5,463,948 A | 11/1995 | Newman |
| 5,584,961 A | 12/1996 | Ellsworth et al. |
| 5,594,961 A | 1/1997 | Yokoi et al. |
| 5,744,921 A | 4/1998 | Makaran |
| 5,755,421 A | 5/1998 | Meier et al. |
| 5,824,116 A | 10/1998 | Zutler |
| D401,808 S | 12/1998 | Grivsky |
| 5,944,931 A | 8/1999 | Cranford |
| 5,948,728 A | 9/1999 | Patton et al. |
| 5,962,368 A | 10/1999 | Poole |
| 6,004,900 A | 12/1999 | O'Brien, III |
| 6,024,650 A | 2/2000 | Reeves |
| 6,047,488 A | 4/2000 | Tuszkiewicz |
| 6,080,465 A | 6/2000 | Boissonnet et al. |
| 6,136,126 A | 10/2000 | Fenzi |
| 6,148,721 A | 11/2000 | Hellmeier et al. |
| 6,186,207 B1 | 2/2001 | Berghauser et al. |
| 6,281,165 B1 | 8/2001 | Cranford |
| 6,998,005 B2 | 2/2006 | Magee et al. |
| 7,077,926 B2 | 7/2006 | Goffi et al. |
| 7,137,426 B2 | 11/2006 | Neri et al. |
| 8,002,931 B2 | 8/2011 | Wang et al. |
| 8,011,922 B2 | 9/2011 | Checcucci |
| 8,460,498 B2 | 6/2013 | Peng et al. |
| 8,562,777 B2 | 10/2013 | Drake |
| 8,726,964 B2 | 5/2014 | Fenzi |
| 9,311,831 B2 | 4/2016 | Henshue et al. |
| 10,184,724 B2 | 1/2019 | Anping et al. |
| 2011/0250405 A1* | 10/2011 | Sawatsky ............ C04B 41/4853 428/174 |
| 2016/0290718 A1 | 10/2016 | Ye et al. |
| 2019/0343309 A1* | 11/2019 | Darlow .............. A47G 19/2227 |

FOREIGN PATENT DOCUMENTS

| | | |
|---|---|---|
| EP | 451067 A1 | 10/1991 |
| FR | 2203321 A5 | 5/1974 |
| GB | 2224974 A | 5/1990 |
| WO | 9706952 A1 | 2/1997 |
| WO | 9821397 A1 | 5/1998 |

* cited by examiner

SUBLIMATION PRINTING ON TO DARK SURFACES

CROSS-REFERENCE TO RELATED APPLICATIONS

This application claims priority to Chinese Invention Patent Application No. 202021611261.4 entitled "SUBLIMATION TRANSFER ON DARK SURFACE OF STAINLESS STEEL CUP" filed before China's National Intellectual Property Administration on Aug. 6, 2020, the entire content of which is incorporated herein by reference.

STATEMENT RE: FEDERALLY SPONSORED RESEARCH/DEVELOPMENT

Not Applicable

BACKGROUND

1. Technical Field

The present disclosure relates to sublimation printing, and more specifically transferring personalized color images on to a dark surface such as that of a stainless steel cup.

2. Related Art

Thermal transfer of images on to a smooth primary color surface of objects is known in the art. Through thermal transfer technology, also referred to as sublimation printing, favorite photos and other personal images or graphics may be printed onto cups and other household objects to provide an additional degree of personalization, with an otherwise mundane utilitarian item transcending into one that is cherished by the owner because of the memories invoked upon each use.

Sublimation printing is readily achievable on ceramic mugs and other objects that have surfaces with flat primary colors. Tumblers constructed of stainless steel may be preferable for holding ones' beverages because of their durability, but sublimation printing on a bare stainless steel can be challenging. A variety of techniques for printing customized images on to stainless steel objects have been developed.

One technique is coating or painting a flat color on to certain portions of the stainless steel surface to accept a sublimation print. A sublimation sheet with the image imprinted thereon with a special ink is applied, and the ink is directly thermally transferred. The original bottom layer color, however, will affect the sublimated image. There may be a substantial color cast if colors in the image are lighter than the background color of the object. Moreover, if the background color is dark, the image, or at least certain portions thereof, may not be visible. Recently, specific treatment of stainless steel surface with a dark colored rough matte surface have been proposed. This type of surface has a texture, feels comfortable, and may interest many consumers. Due to the rough matte surface, however, it may be difficult to achieve personalized thermal transfer using conventional technology.

BRIEF SUMMARY

In order to overcome the problems of the art, the present disclosure proposes thermal printing method on to a stainless steel cup with a dark-colored surface. The stainless steel cup is provided with one or several screen-printing layers on rough dark or other dark surface to fill the pits in the rough surface. Thereafter, a thermal transfer process is used to achieve a colorful photograph on the dark rough surface of the stainless steel cup.

The present invention the object is achieved in that: the thermal transfer surface of a dark, stainless steel cup, disposed on the cup comprises a stainless steel surface of the base circle vitro dark color surface treatment layer, the stainless steel depth of color surface treatment layer sequentially Settings: At least one screen printing layer, resin layer, and thermal transfer image layer.

Further, the screen-printing layer may be a white screen-printed layer.

Further, a two-layer screen printing process may be utilized.

Further, the screen-printed layer may surround the peripheral surface of the cup 360 degrees at least one printing area.

Further, the screen-printing layer may be less than the peripheral surface of the cup 360 of the at least one printing area.

Further, the printing area may be a circular or elliptical area.

Further, the printed region may be a polygonal region.

Further, the shape of the polygon may be a square or rectangular region.

Further, the shape of the polygonal area may be a triangle or a trapezoid.

Further, the shape of the polygonal area may be a pentagram or six-cornered.

The advantages and beneficial effects of the utility model are that the utility model is provided with one or several screen-printing layers on the black or other dark rough surface to fill up the rough pits on the black or other dark surface. After the smooth surface is formed, a thermal transfer resin coating is applied, and then thermal transfer is performed, so that a stainless-steel cup with a black or other dark rough surface can also form a colorful personalized product.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of sublimation transferring images on to dark surfaces of workpieces. The detailed description set forth below in connection with the appended drawings is intended as a description of the several presently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

First Embodiment

Figure 1:
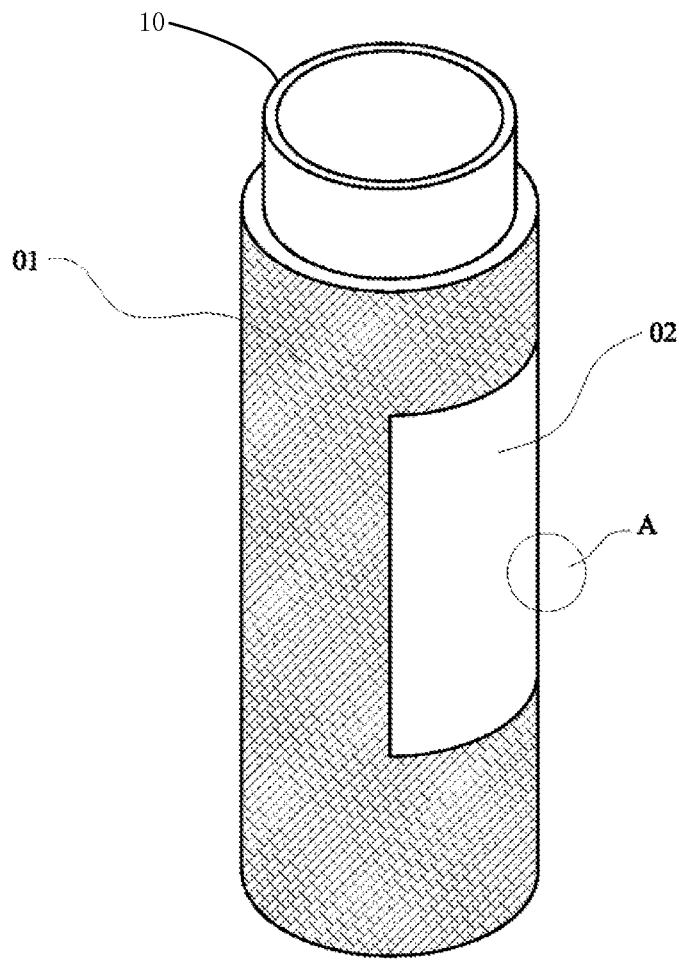
FIG. 1 is a perspective view of a stainless steel cup with a dark surface on which an image is to be thermally transferred according to one embodiment of the present disclosure.
Figure 2:
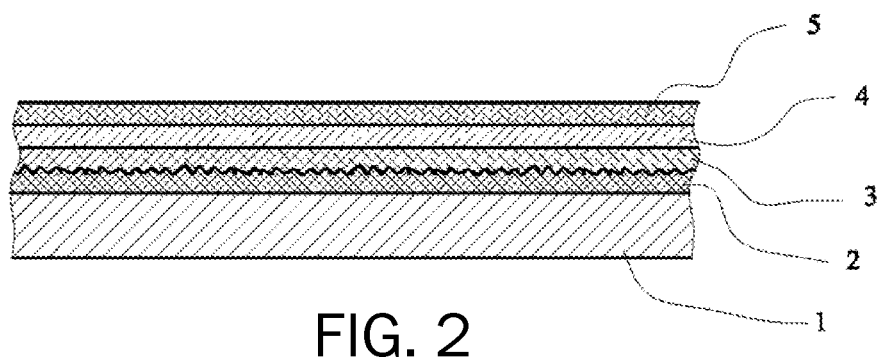
FIG. 2 is a cross-sectional view of the surface coating structure of the stainless steel cup with a dark surface according to an embodiment of the present invention and is an enlarged portion A of FIG. 1.

With reference to FIG. 1, one embodiment of the present disclosure involves thermally transferring an image on to a stainless steel cup 10 with a dark surface. Although the present disclosure refers to a stainless steel construction, and the workpiece being a cup, this is by way of example only and not of limitation. Any other workpiece or object, constructed of any suitable material therefor, may also be utilized in connection with the embodiments of the present disclosure. The fine grid pattern shown in FIG. 1 is understood define an area 01 that has undergone a dark surface treatment, and the white rectangular area represents the portion 02 that is screen printed. The outer circular surface of the stainless steel cup 10 has been subjected to a dark surface treatment on the base layer 1 to form a dark rough surface treatment layer 2. On the dark rough surface treatment layer 2, there is at least one layer of wire. FIG. 2 shows a screen printing layer 3, a resin layer 4, and a thermal transfer image layer 5.

The dark rough surface treatment layer 2 described in this embodiment may be produced with a chemical treatment method in which the smooth and flat stainless steel base layer surface is transformed into a surface that accepts a sublimation transfer of an image with accurate color reproduction across the entire palette of the image. In some cases, the treatment will darken the smooth surface at the same time together with imparting a rough texture on to the dark color surface. The surface of the workpiece or cup 10 after an embodiment of the treatment process may be characterized by a rough or irregular surface, which some users may desire so that the cup may be held with greater stability. It should be noted that the "smooth" and "rough" textures mentioned herein may refer to a user's feeling of the surface, rather than the surface roughness defined by mechanical processing. As presently contemplated, a "dark" surface may be more particularly identified by specific colors, for example, pure black, dark brown, brown, or dark blue, or dark reddish brown, purple, brown and other various visually suitable as a background photo of dark color.

In order for the personalized color image to be transferred to the thermal transfer layer workpiece or the cup 10 while retaining color depth, various embodiments of the present disclosure contemplate a first stainless steel dark color treatment layer on the screen print. Screen printing is to effect deep color white surface, to be able to see a photograph as a background, when the dark surface is a rough surface when the white screen printing a layer or more white layers, the rough surface of the filled pothole.

In most cases, the thermally transferred image is a color photo, so the "white" described in this embodiment is a color that can contrast the color of the photo when viewed with the naked eye. Therefore, the screen-printed layer formed by screen printing can be white, or other colors can bring photos, such as light blue, pale pink and so on. Of course, other colors other than white can also be screen-printed to make the thermal transfer image produce special artistic effects. Screen printing may be performed only once, or multiple times, depending on the roughness and the color of the stainless steel. When the stainless steel dark color surface treatment layer is smooth, or is characterized by minimal roughness, the screen printed layer of the brush can be formed relatively flat and smooth surface. However, when the roughness of the color treatment layer surface is high, secondary screen printing may be necessary such that a superposition of multiple screen printing layers may be formed to ultimately define a smooth surface.

To maintain the color and texture of the inner stainless steel surface of the workpiece 10, screen printing and image thermal transfer may be limited to a selected region thereof. This area may be rectangular, circular, oval, diamond, trapezoid, five-pointed star, six-pointed star and other shapes. The printed area can be a single area or may multiple areas on the workpiece 10. For example, multiple small stars can be printed, and separate photographs may be thermally transferred to each of the stars.

The process for realizing the multiple coatings described in this embodiment may include screen printing—drying—screen reprinting—re-drying—resin—coating—drying—heat transfer printing. Drying may be performed after each screen printing and resin coating. Screen printing can be performed automatically by an artificial intelligence small screen-printing machine, which usually takes only one or two seconds. After screen printing white (lacquer), it may be coated with resin to complete the preparation of the coating for thermal transfer. The whole set of equipment is relatively simple, and the operation is relatively simple. It can be realized by ordinary people after simple training, so that personalized products can be widely produced. It may be realized by a continuous line from the automated production, to achieve mass production, reduce costs and improve productivity.

Second Embodiment

This embodiment contemplates an improvement involving a refinement relating to the on screen printing layer. The screen-printing layer described in this embodiment may be a white screen-printing layer.

White is the most suitable as the background color of the photo, so this embodiment uses white as the color of the screen-printing layer.

Third Embodiment

This embodiment contemplates an improvement of the above and relates to the refinement of the screen-printing layer. The screen-printing layer described in this embodiment may have two layers.

Two screen printed layers can generally have a dark color, and the surface roughness of the stainless steel may be improved such that it is suitable for the thermally transferring an image.

Fourth Embodiment

This embodiment contemplates and improvement of the foregoing and relates to a refinement of the screen-printing layer above. The screen-printing layer of this embodiment may be at least one printed area that surrounds the outer circular surface of the cup by 360 degrees.

The screen printed area in this embodiment appears as a belt that surrounds the entire surface of the body of the cup or workpiece 10. The position of the belt can be vertical or horizontal. The color area is masked.

Fifth Embodiment

This embodiment may be an improvement of the above and pertains to a refinement of the screen-printing layer. The screen-printing layer in this embodiment may be at least one printed area that is less than 360 degrees around the outer circular surface of the cup or workpiece 10. This may correspond to the illustrated embodiment of FIG. 1, in which a defined area of the surface of the workpiece 10 is color printed.

Sixth Embodiment

This embodiment contemplates an improvement of the above directed to a refinement of the printing area. The printed area described in this embodiment may be a circular or elliptical area. A circle or oval is a commonly used to frame a portrait photograph and can be used show classical beauty and is a favorite frame of purchasers.

Seventh Embodiment

This embodiment contemplates an improvement of the above and may similarly a refinement of the printing area. The printed area of this embodiment may be a polygonal area.

Polygons can be regular polygons, such as regular hexagons, regular quadrilaterals, etc., or irregular polygons, such as oblique quadrilaterals and trapezoids.

Eighth Embodiment

This embodiment contemplates an improvement of the above and may be a refinement directed to the polygonal area described earlier. The shape of the polygonal area described in this embodiment may be a square or a rectangle.

A square or rectangle shape is the most commonly used image format, suitable for landscape photography or landscape photography.

Ninth Embodiment

This embodiment is directed to an improvement of the above and may be a refinement of the polygonal area described earlier. The shape of the polygonal area may be a triangle or a trapezoid.

Triangles or trapezoids are rarely used in a photograph frame, but in order to reflect individuality, such a shape may be provided.

Tenth Embodiment

This embodiment is directed to an improvement of the above and may be a refinement of the polygonal area described earlier. The shape of the polygonal area may be a five-pointed star or a six-pointed star.

The five-pointed star or the six-pointed star may be perceived as a beautiful and generous frame form, especially suitable for the frame of individuals who have special feelings for each other. The five-pointed star or the six-pointed star can be a regular five-pointed star or a regular six-pointed star, though it can also be a five-pointed star or a six-pointed star with various deformations such as an oblique five-pointed star or an oblique six-pointed star.

Finally, it should be noted that the above are intended to illustrate the present invention in the art and not limit it in any way, although with reference to the preferred arrangement of the present invention has been described in detail, those of ordinary skill in the art should be understood that the present invention in the art programs (such as stainless steel cup shape, stainless steel dark color surface treatment layer of the texture and surface roughness, etc.) to be modified or equivalently substituted without departing from the present invention from the spirit and scope of the technical solutions.

What is claimed is:

1. A cup on to which an image is thermally transferred, comprising:
    a base layer extending around an outer peripheral surface of a cup body;
    a darkened color surface treatment layer disposed on the base layer;
    a screen printing layer disposed on the darkened color surface treatment layer;
    a resin layer disposed on the screen printing layer; and
    a thermal transfer layer that accepts the image.

2. The cup of claim 1, wherein the darkened color surface treatment layer, the screen printing layer, the resin layer, and the thermal transfer layer covers a subset area of the outer peripheral surface of the cup body.

3. The cup of claim 1, wherein base layer of the cup is stainless steel.

4. The cup of claim 1, wherein the screen printing layer is colored white.

5. The cup of claim 4, wherein the screen printing layer includes two separate layers.

6. The cup of claim 1, wherein the screen printing layer is at least one area encircling an entirety of the outer peripheral surface of the cup body.

7. The cup of claim 1, wherein the screen printing layer is at least one area encircling less than an entirety of the outer peripheral surface of the cup body.

8. The cup of claim 1, wherein a subset area of the outer peripheral surface of the cup corresponding to the screen printing layer is circular.

9. The cup of claim 1, wherein a subset area of the outer peripheral surface of the cup corresponding to the screen printing layer is elliptical.

10. The cup of claim 1, a subset area of the outer peripheral surface of the cup corresponding to the screen printing layer is polygonal.

11. The cup of claim 10, wherein a shape of the subset area of the outer peripheral surface of the cup corresponding to the screen printing layer is a square.

12. The cup of claim 10, wherein a shape of the subset area of the outer peripheral surface of the cup corresponding to the screen printing layer is a rectangle.

13. The cup of claim 10, wherein a shape of the subset area of the outer peripheral surface of the cup corresponding to the screen printing layer is a triangle.

14. The cup of claim 10, wherein a shape of the subset area of the outer peripheral surface of the cup corresponding to the screen printing layer is a trapezoid.

15. The cup of claim 10, wherein a shape of the subset area of the outer peripheral surface of the cup corresponding to the screen printing layer is a star.

16. The cup of claim 15, wherein the star shape of the subset area of the outer peripheral surface of the cup is five-pointed.

17. The cup of claim 15, wherein the star shape of the subset area of the outer peripheral surface of the cup is six-pointed.

\* \* \* \* \*